US012363817B1

(12) United States Patent
McLaine et al.

(10) Patent No.: US 12,363,817 B1
(45) Date of Patent: Jul. 15, 2025

(54) APPARATUS FOR COLLECTING ELECTRONS FROM CLOUD BOTTOMS AND CLOUD TUBES

(71) Applicants: Ray McLaine, Thousand Oaks, CA (US); Carol McLaine, Thousands Oaks, CA (US)

(72) Inventors: Ray McLaine, Thousand Oaks, CA (US); Carol McLaine, Thousands Oaks, CA (US)

( * ) Notice: Subject to any disclaimer, the term of this patent is extended or adjusted under 35 U.S.C. 154(b) by 0 days.

(21) Appl. No.: 18/759,276

(22) Filed: Jun. 28, 2024

(51) Int. Cl.
*G03G 15/02* (2006.01)
*H01T 23/00* (2006.01)
*H05F 3/00* (2006.01)
*H05F 7/00* (2006.01)

(52) U.S. Cl.
CPC .................................... *H05F 7/00* (2013.01)

(58) Field of Classification Search
CPC ........................................................ H05F 7/00
USPC ........................................................ 361/235
See application file for complete search history.

(56) References Cited

U.S. PATENT DOCUMENTS 367,435 A 8/1887 O'Brien
674,427 A * 5/1901 Palencsar ............. G05B 11/016 174/4 R
1,284,982 A 11/1918 Balsillie
1,928,963 A 10/1933 Chaffee
5,036,785 A * 8/1991 Kittredge, Jr. .......... B63B 43/00 114/127
5,367,245 A 11/1994 Mims
5,528,264 A * 6/1996 Kautzer ................. A61B 6/548 345/158
5,694,286 A 12/1997 Fowler et al.
6,020,724 A * 2/2000 O'Loughlin ............ H02J 7/345 320/167
6,474,595 B1 11/2002 Herman
6,597,559 B2 7/2003 Betts
7,855,476 B2 12/2010 Ogram
8,451,575 B2 5/2013 Chung
8,502,507 B1 8/2013 White et al.
8,508,907 B2 8/2013 Mayer
8,773,834 B2 7/2014 Hyde et al.
2003/0090238 A1* 5/2003 Wolin ............... H02J 7/007194 320/150
2006/0284004 A1 12/2006 Jones
2007/0291514 A1* 12/2007 Shen ....................... H02M 3/08 363/15
2011/0102961 A1* 5/2011 Lane ......................... H05F 7/00 361/212

(Continued)

FOREIGN PATENT DOCUMENTS

WO 2021055549 A1 3/2021

*Primary Examiner* — Jared Fureman
*Assistant Examiner* — Lucy M Thomas

(57) ABSTRACT

The apparatus for collecting electrons from cloud tubes is comprised of a conductive outer tube, a conductive inner cylinder, a first insulating base, a starting power system, a second insulating base, a plurality of insulating legs and a collection power system. The conductive inner cylinder being mounted within the conductive outer tube, and both being mounted on the insulating base. The starting power system supplies a high voltage positively charged current to the conductive outer tube. This high voltage positively charge attracts electrons to the conductive inner cylinder where they are collected and stored by the collection power system.

9 Claims, 12 Drawing Sheets

(56) References Cited

U.S. PATENT DOCUMENTS

| | | | | |
|---|---|---|---|---|
| 2011/0174892 | A1 | 7/2011 | Fluhrer et al. | |
| 2013/0033120 | A1* | 2/2013 | Ogram | H01Q 1/28<br>307/145 |
| 2015/0359076 | A1 | 12/2015 | Barinov | |
| 2019/0245327 | A1 | 8/2019 | Matsumoto | |

* cited by examiner

APPARATUS FOR COLLECTING ELECTRONS FROM CLOUD BOTTOMS AND CLOUD TUBES

FIELD OF THE INVENTION

The present invention relates generally to methods of attracting and collecting electrons. More specifically, the present invention is an apparatus for attracting and collecting electrons from cloud bottoms and cloud tubes.

BACKGROUND OF THE INVENTION

Weather is controlled through gravity and electromagnetism. In the Northern Hemisphere, the atmosphere above the earth is flooded with negatively charged electrons; these negatively charged electrons are supplied by sources such as the sun. Positively charged particles are pulled upward and meet with the negatively charged electrons in the atmosphere. When the oppositely charged particles meet, there is an electric discharge process, and if there is sufficient water vapor in the air, a cloud is formed.

As negatively charged electrons move towards the earth, they create invisible tubes which converge to a point. Positively charged dust and protons on the earth's surface move up to meet them. Moving positive charges diverge and create tubes. Lightning, dust devils, tornadoes, and hurricanes are all formed when a stream of electrons in the atmosphere moves down to earth to discharge dust and other positively charged elements. Lightning Strikes, Dust Devils, Tornadoes, and Hurricanes are all similar phenomena; "electric discharge," the only difference is the amount of voltage that drives them and the time they take to discharge.

Therefore, there is a need for an invention which allows us to drain the electrons from clouds and cloud tubes. By draining the electrons, we would be able to prevent damage caused by weather phenomena. Further, the collected electrons would be a source of clean energy that may be sold or used to power any number of electrical devices.

SUMMARY OF THE INVENTION

The present invention is an apparatus for the collection of electrons from cloud bottoms and cloud tubes comprised of a conductive outer tube, a conductive inner cylinder, an insulating base, a starting power system, and a collection power system. The conductive inner cylinder is mounted concentrically within the conductive outer tube. Both the conductive outer tube and the conductive inner cylinder are mounted to the insulating base, which keeps them electrically isolated. The starting power system supplies a high voltage positively charged current to the conductive outer tube. This high voltage positively charge attracts electrons to the conductive inner cylinder where the electrons are collected and stored by the collection power system.

The present invention provides an apparatus for collecting electrons from clouds and cloud tubes and thereby allows a user to drain electrons from clouds and cloud tubes in any number of locations. The present invention may be utilized to protect residential or commercial locations and cities from lightning, tornadoes, or other severe storms. Further embodiments mounted to a ship may be utilized to drain electrons from the cloud tubes and at the bottom of the ocean which power hurricanes thereby weaking or eliminating these storms. These Hurricane tubes at the bottom of the ocean have the highest concentration of flowing electrons on the planet. According to NOAA.gov, "During just one hurricane, raging winds can churn out about half as much energy as the electrical generation capacity of the entire world, while cloud and rain formation from the same storm might release a staggering 400 times that amount."

While reducing these weather phenomena, the present invention further provides a source of clean green energy which may be used to charge batteries, used to power devices or other electrical functions, or sold directly to the power grid. The present invention further provides a source of green energy that can be collected from tornado tubes, at the bottom of the ocean from hurricanes, and from clouds in the sky which can be used to recharge batteries run electric motors, or sold directly to the power grid.

DETAIL DESCRIPTIONS OF THE INVENTION

Figure 1:
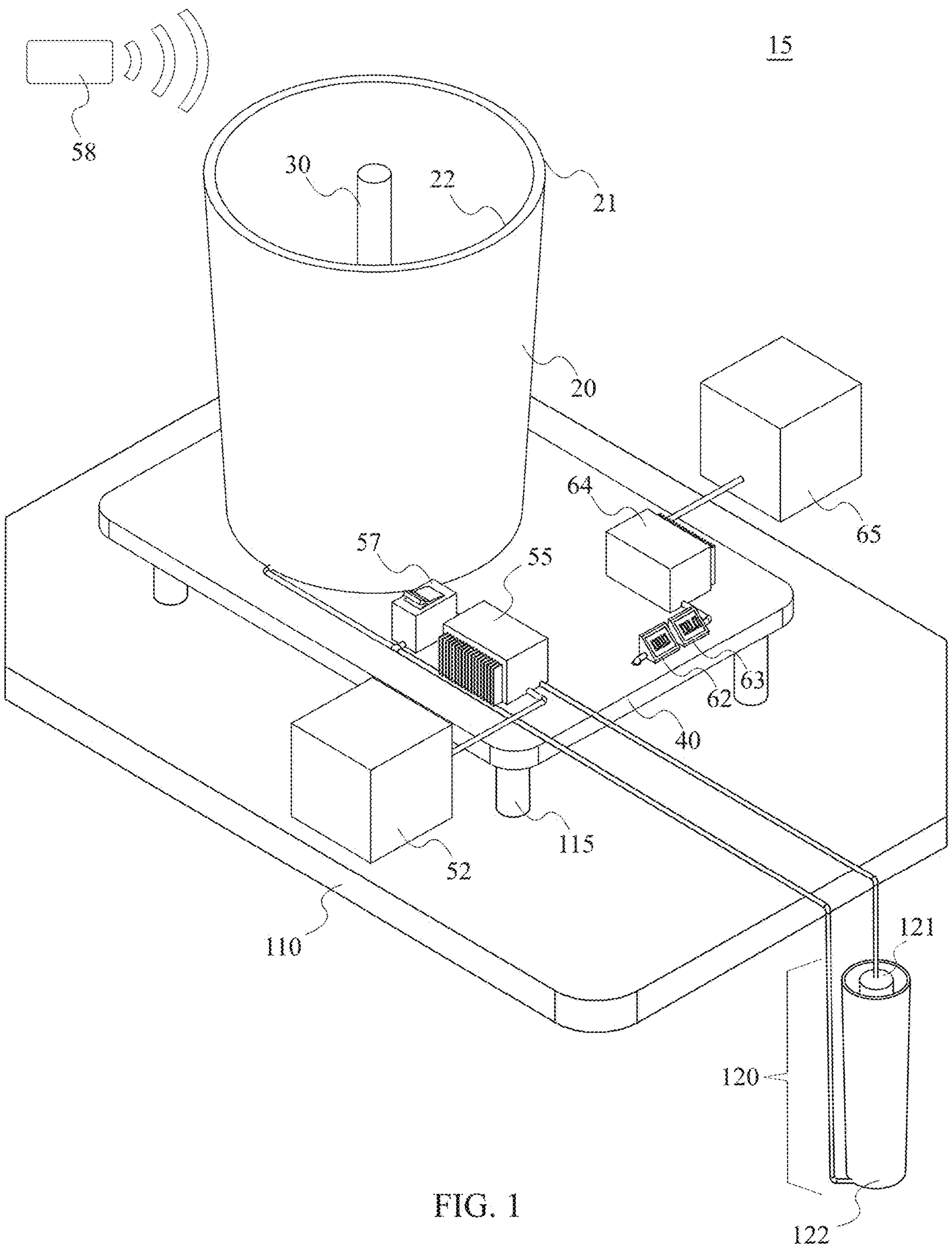
FIG. 1 shows a left-top-front perspective view of a preferred embodiment of the present invention.
Figure 2:
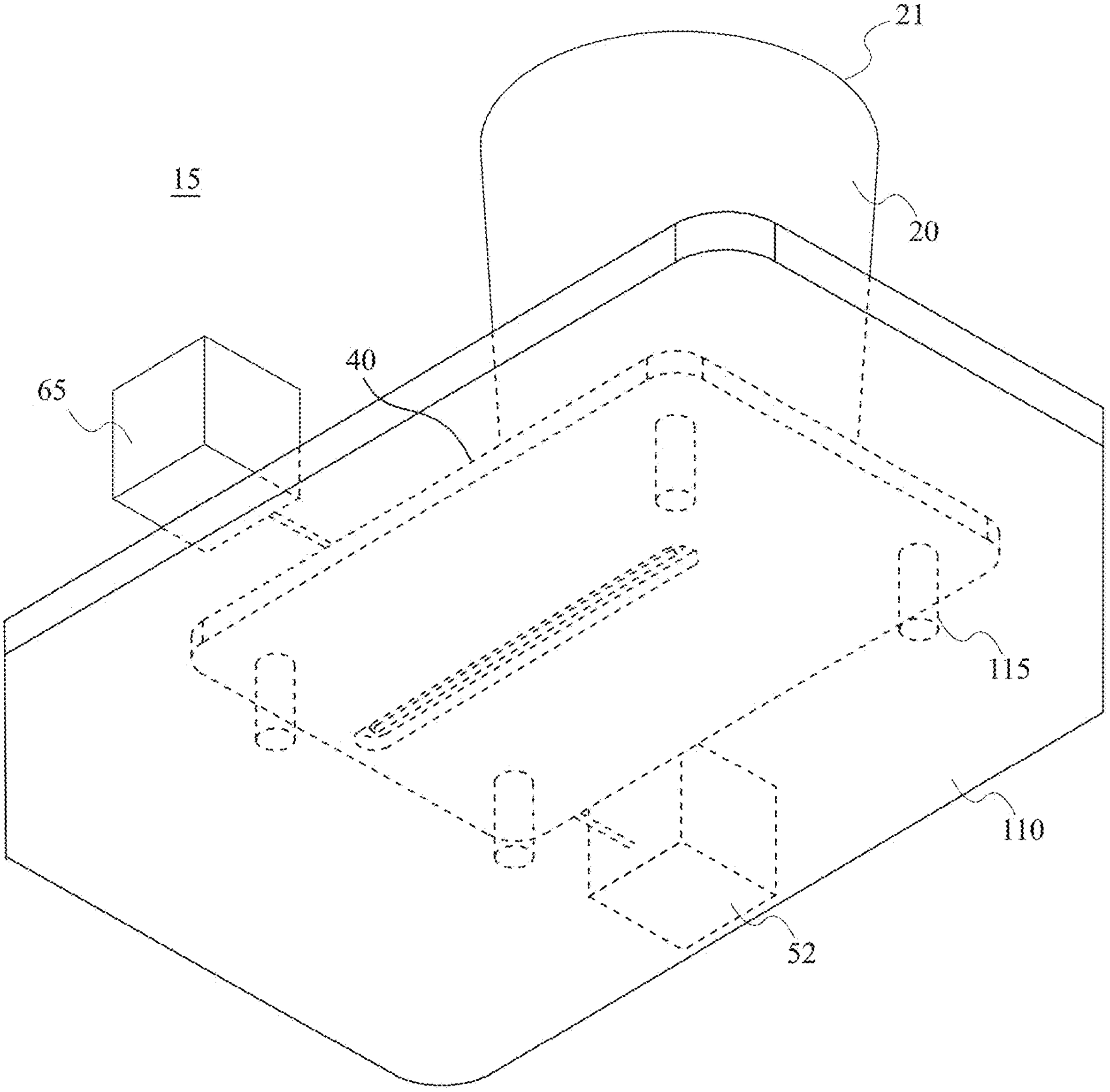
FIG. 2 shows a right-bottom-rear perspective view of a preferred embodiment of the present invention.
Figure 3:
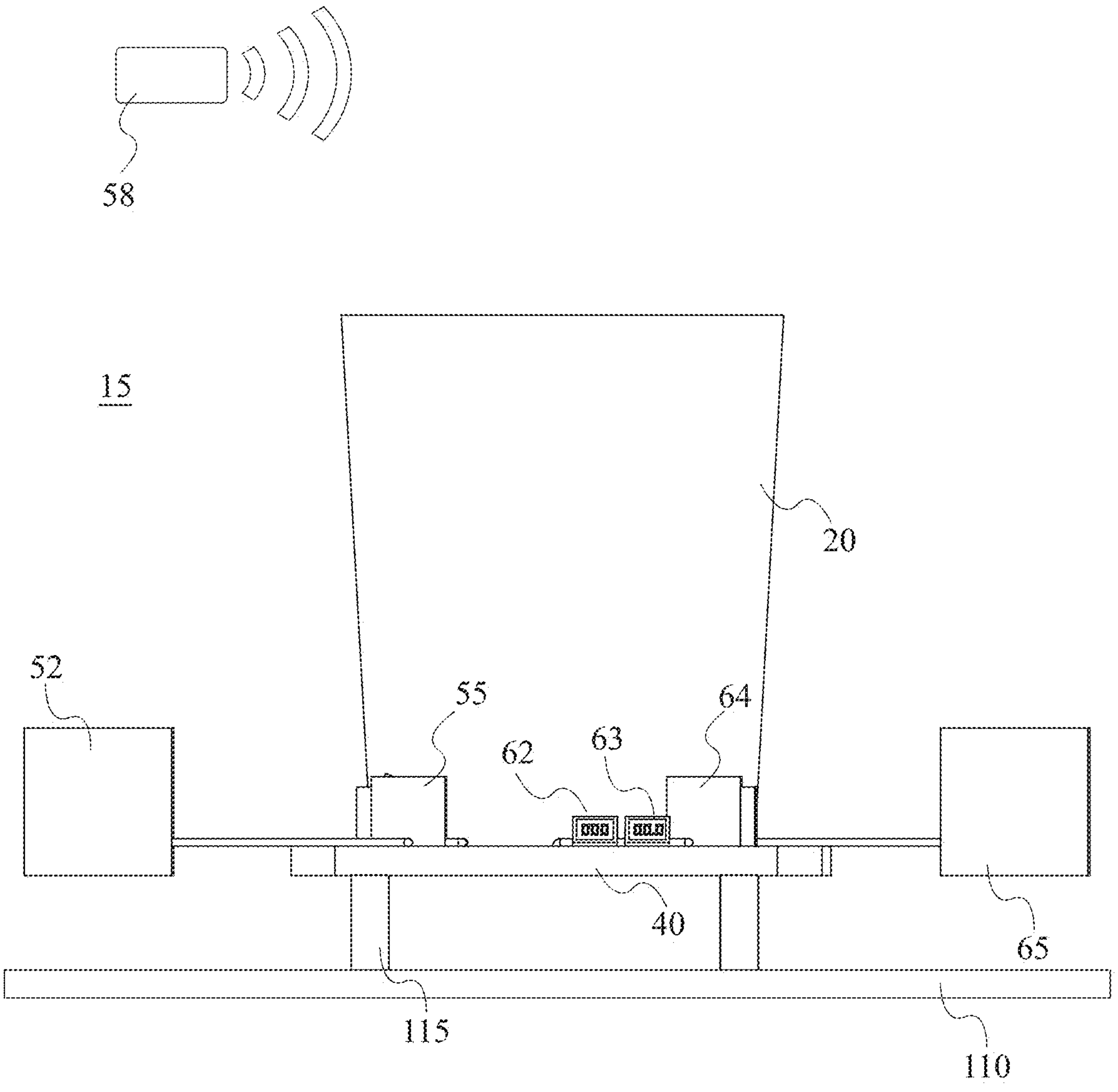
FIG. 3 shows a front elevational view of a preferred embodiment of the present invention.

All illustrations of the drawings are for the purpose of describing selected versions of the present invention and are not intended to limit the scope of the present invention.

The present invention is an apparatus for collecting electrons from cloud tubes and negatively charged bottoms of clouds which utilizes the following terms and scientific principles:

Atoms of air will fall due to gravity. All other forces and movements are created by electromagnetism as described by Maxwell's 4 equations of divergence and curl.

Wind moves in all directions because the atoms in our atmosphere have positive and negative charges. Positive and negative charges attract each other, while particles of the same charge repel each other.

Temperature is created by charged particles hitting atoms in our atmosphere. When a charge particle, infrared light, or Gama Rays, hits an atom in the air or in the ocean, the charge particle passes on some of their kinetic energy to the atom. This passed kinetic energy makes the atom vibrate and thereby creates heat. An example of this is heating water. Water can be heated via an electric stove or a microwave oven; both devices are electromagnetic. As a further example, gas stoves may also be used to heat water. Gas stoves utilize a flame which is a plasma and full of charge particles. These charged particles hit the iron molecules of your pan and cause them to vibrate, transferring the kinetic energy to the pan. Therefore, all heat is electromagnetic.

Low pressure is caused by moving electrons. In areas with a higher concentration of free electrons, electrons are repelled from each other, thereby creating an area of lower density and lower pressure. The higher the concentration of electrons, the lower the pressure will be. The lower the concentration of electrons, the higher the pressure will be. When electrons are moving in a tube, adjacent electrons will combine their magnetic field and have one large magnetic field and thereby create a fluid like flow. In this process, the electrons push $O_2$ and $N_2$ molecules out of their path creating a low-pressure tube.

Dust is composed of very small particles of dirt. Dust can easily become airborne. This is highlighted by the yearly dust storms that originate in North Africa, cross the Atlantic Ocean and dump their dust on the southern part of the United States.

Analysis of dust collected from Africa revealed that the dust was comprised of the following elements and that dust is positively charged:

Sodium (Na)—positively charged
Aluminum (Al)—positively charged
Potassium (K)—positively charged
Calcium (Ca)—positively charged
Iron (Fe)—positively charged
Titanium (Ti)—positively charged
Sulfur Oxide (SO)—negatively charged The dust analysis revealed that six of the seven elements are positively charged. Dust is important because it is everywhere. It is in the air, on the land, in the oceans and other bodies of water. The bottom of the oceans has been collecting dust since the beginning of time and the dust layer may be several feet to miles deep. Dust is further seen in dust devils and tornados moving upwards into the atmosphere.

The atmosphere above the earth is flooded with negatively charged electrons, these negatively charged electrons being supplied by sources such as the sun. Clouds are formed or created when positively charged particles are pulled upward and meet with the negatively charged electrons and water vapor in the atmosphere which is:

$$2H_2O \rightarrow H_3O^{(+)} + OH^{(-)}.$$

When the oppositely charged particles meet, there is a discharge process, and a cloud is formed.

The bottoms of the clouds are observed to be mostly dark because they are continually pulling up positively charged dust. This positively charged dust discharges with electrons and further forms clouds. This is difficult to see because dust particles are very small, similar to the dust that sticks to a computer screen. When these fine dust particles are in the air, they are difficult if not impossible to see.

As dust is pulled upward, a flow of dust is formed. As the positively charged dust is pulled upward, negative electrons are pulled downward to further discharge with the positively charged particles of the earth. These two opposing flows create a "McLaine Coaxial Magnetic Tube" where negatively charged particles flow downward towards the earth, while positively charged particles flow up and around the electrons creating a tube. A "McLaine Coaxial Magnetic Tube" is further referred to and also known as a cloud tube 90, shown in FIG. 8. The moving electrons and positively charged particles in a cloud tube 90 have spinning magnetic fields, which spin the tubes and hold them together. The magnetic fields also hold the charged positive and negative charged particle apart so they can't discharge in the tubes.

Lightning Strikes, Dust Devils, Tornadoes, and Hurricanes are all similar phenomenon, created by these cloud tubes 90. The only difference is the amount of voltage that drives them and the time they take to discharge. Both of these factors are related to the number of charges available to be discharged. Just think of a dust devil as a small tornado and a Hurricane as a group of Tornadoes in the Ocean.

The present invention is an apparatus for collecting electrons from cloud tubes 90. By collecting these electrons in an orderly fashion, this weather phenomenon should be able to be prevented, controlled or eliminated.

Lightning is created when a cloud collects a high concentration of electrons and forms a voltage greater than 100 million volts. By utilizing the present invention, clouds may be drained of electrons and the voltage would be reduced. If the voltage within a cloud is reduced to below 100 million volts, lightning strikes will be eliminated.

Dust Devils and Tornadoes are formed when a stream of electrons in a cloud tube 90 moves down to earth to discharge dust, protons, and other positively charged elements. The electrons move downward in the center of a tornado. As the electrons move downward, they create spinning magnetic fields which move the air and create the tornado effect. Positively charged particles further create spinning magnetic fields as they are moved upward toward the clouds, creating a tube of positively charged particles which wraps around the negatively charged electron tube.

Dust devils and tornadoes are not able to form when a cloud is drained to a voltage below 20K volts (K=thousand). Therefore, the present invention may be used in locations to protect both people and property from tornadoes. The present invention would be placed in a semi-circle around the protected area on the side where a tornado would normally enter. In some embodiments, they would be placed about five tubes per mile and two to three rows deep around locations such as shopping centers, residential properties, and cities.

Hurricanes are formed when multiple tornadoes in the ocean move close together and start rotating around each other. These rotating tornados open up and the eye of a hurricane as it is formed. In the Northern Hemisphere Tornadoes over water work similar to tornadoes on land, with negatively charged electrons moving downward and positively charged particles moving upward. In the Southern Hemisphere the charges are reversed Positive charges are moving down and electrons are coming out of the ground and moving up. In the Northern Hemisphere they spin CCW and in the Southern Hemisphere they spin CW. The difference between tornados over water versus over land is that over water in order to reach dust, the cloud tube 90 must extend to the dust layer on the bottom of the ocean.

When the cloud tube 90 locates a good source of positive charges it will anchor in that location as long as there is a large supply of positive charges. Meanwhile, the part of the cloud tube 90 above the water, the hurricane, gets blown across the ocean. The cloud tube 90 will still hold its anchor in a location as long as the supply of positive charges is available. This phenomenon stretches the cloud tubes 90 under the water. These underwater cloud tubes, 90 have been seen to extend thousands of miles.

Hurricanes can be weakened and eliminated by disrupting the flow of negatively charged electrons and positively charged particles within the cloud tube 90. Draining the cloud tube 90 of the negatively charged electrons would slow and eventually stop the cloud tube 90 powering these large storms. Thereby, the present invention when mounted to a ship may be used to intercept the electrons within these underwater cloud tubes and weaken or eliminate hurricanes. In the Northern Hemisphere these underwater tubes have negative charges moving to the bottom. In the Southern Hemisphere the charges are reversed.

The present invention has the further benefit of providing a low cost clean energy source. When electrons are collected from cloud tubes 90, these electrons may be collected and stored. These collected electrons may then be sold on the commercial energy market or used to power all number of electrical devices.

As an example, it has been found that a single hurricane may generate as much as 1.5 T watts of power. This is half the total electrical generation capacity of the earth. Therefore, capturing even a small fraction of this power would create a huge clean energy source.

In further embodiments, the present invention may use a power source to provide a constant source of positive energy. This high concentration of positive energy or high voltage positive charge allows the present invention to attract negatively charged electrons from both a very close proximity and from longer distances. Thereby, the present invention can be used to attract and absorb any negatively charged electrons within proximity to the present invention.

Referring now to FIG. 1 through FIG. 5, the present invention is an apparatus for collecting electrons from cloud bottoms and cloud tubes 15 which serves the function of attracting, collecting, and storing negatively charged electrons within a proximity to the present invention. The apparatus for collecting electrons from cloud bottoms and cloud tubes 15 comprises: a conductive outer tube 20, a conductive inner tube 30, a first insulating base 40, a starting power system 50, and a collection power system 60.

The conductive outer tube 20 of the present invention serves the function of conducting and holding a high voltage positive charge. The conductive outer tube 20 may have any suitable shape or design including but not limited to boxes, tubes, or bells. In a preferred embodiment of the present invention, the conductive outer tube 20 is shaped as a tube. The tube shape of the conductive outer tube 20 having and having an exterior diameter 21 and an interior diameter 22. The exterior diameter 21 forms the exterior surface of the tube and the interior diameter 22 forms the interior surface of the tube.

The conductive outer tube 20 may be constructed from any suitable material or means for holding and transferring a high voltage such as metals, or other conductive materials. In the preferred embodiment, the conductive outer tube 20 is constructed from a conductive metal such as copper.

The conductive inner cylinder 30 of the present invention serves the function of conducting and holding a high voltage negative charge. In the preferred embodiment, the conductive inner cylinder 30 is further configured to receive a collection of electrical current 61 from a cloud tube 90. The bottom of clouds is negatively charged and in fact is continuously discharging with positively charged dust and free protons on the ground.

The conductive inner cylinder 30 may have any suitable shape or design including but not limited to solid cylinders, tubes, squares, or wires. In the preferred embodiment of the present invention, the conductive inner cylinder 30 has a tube shape. The conductive inner cylinder 30 may be positioned in any suitable location within the present invention. In the preferred embodiment, the conductive inner cylinder 30 is position within the interior diameter 22 of the conductive outer tube 20 with the conductive inner cylinder 30 is concentric with the interior diameter 22 of the conductive outer tube 20. Thereby, in the preferred embodiment, the conductive inner cylinder 30 is concentric or centered within the tube of the conductive outer tube 20.

The conductive inner cylinder 30 may be constructed from any suitable material or means for holding and transferring a high voltage such as metals, or other conductive materials. In the preferred embodiment, the conductive inner cylinder 30 is constructed from a conductive metal such as copper.

The first insulating base 40 of the present invention serves the function of being the primary base or structure of the present invention. The first insulating base 40 further serves to keep all of the electrical components electrically isolated or insulated from each other. In further embodiments, the first insulating base 40 may provide a surface which may serve as a mounting surface, allowing the present invention to be mounted to any suitable surface or structure.

The first insulating base 40 may take any suitable shape or design as needed to provide support and insulation. In the preferred embodiment, the first insulating base 40 is a first plate having a flat surface. The first insulating base 40 may be constructed of any suitable means or material needed to provide support and insulation including but not limited to plastics, ceramics, or glasses. In the preferred embodiment, the first insulating base 40 is constructed from an insulating plastic material.

In accordance with some embodiments, the present invention further comprises a second insulating base 110, and a plurality of insulating legs 115. The second insulating base 110 and the plurality of insulating legs 115 serve as the secondary base structure. The second insulating base 110 provides the means for the present invention to be rested or placed on a ground or a flat surface, while at the same time providing electrical isolation or insulation from said ground or flat surface. The plurality of insulating legs 115 are mounted to the second insulating base 110. The first insulating base 40 can be mounted on the plurality of insulating legs 115. The second insulated base 110 and the plurality of insulating legs 115 provide further electrical isolation or insulation from said ground or flat surface. The second insulating base 110 may take any suitable shape or design as needed to provide support and insulation. In the first preferred embodiment, the second insulation base 110 is a second plate having a flat surface. The second insulating base 110 may be constructed or any suitable material as needed to provide support and insulation including but not limiting to plastics, ceramics, or glasses. In the preferred embodiment, the second insulating base 110 is constructed from said insulating plastic material.

The conductive outer tube 20 and the conductive inner cylinder 30 are attached to the first insulating base 40. In the preferred embodiment, the conductive outer tube 20 is attached to the flat surface of the first insulating base 40. The conductive inner cylinder 30 is further attached to the flat surface of the first insulating base 40 centered within the conductive outer tube 20. The electrical insulating and isolating properties of the first insulating base 40 provides electrical insulation between the conductive outer tube 20 and the conductive inner cylinder 30. Thereby, the conductive outer tube 20 is electrically isolated from the conductive inner cylinder 30. Components such as the conductive outer tube 20 and the conductive inner cylinder 30 may be attached to the first insulating base 40 through any suitable means for attachment or mounting such as threaded fasteners or adhesives.

Figure 6:
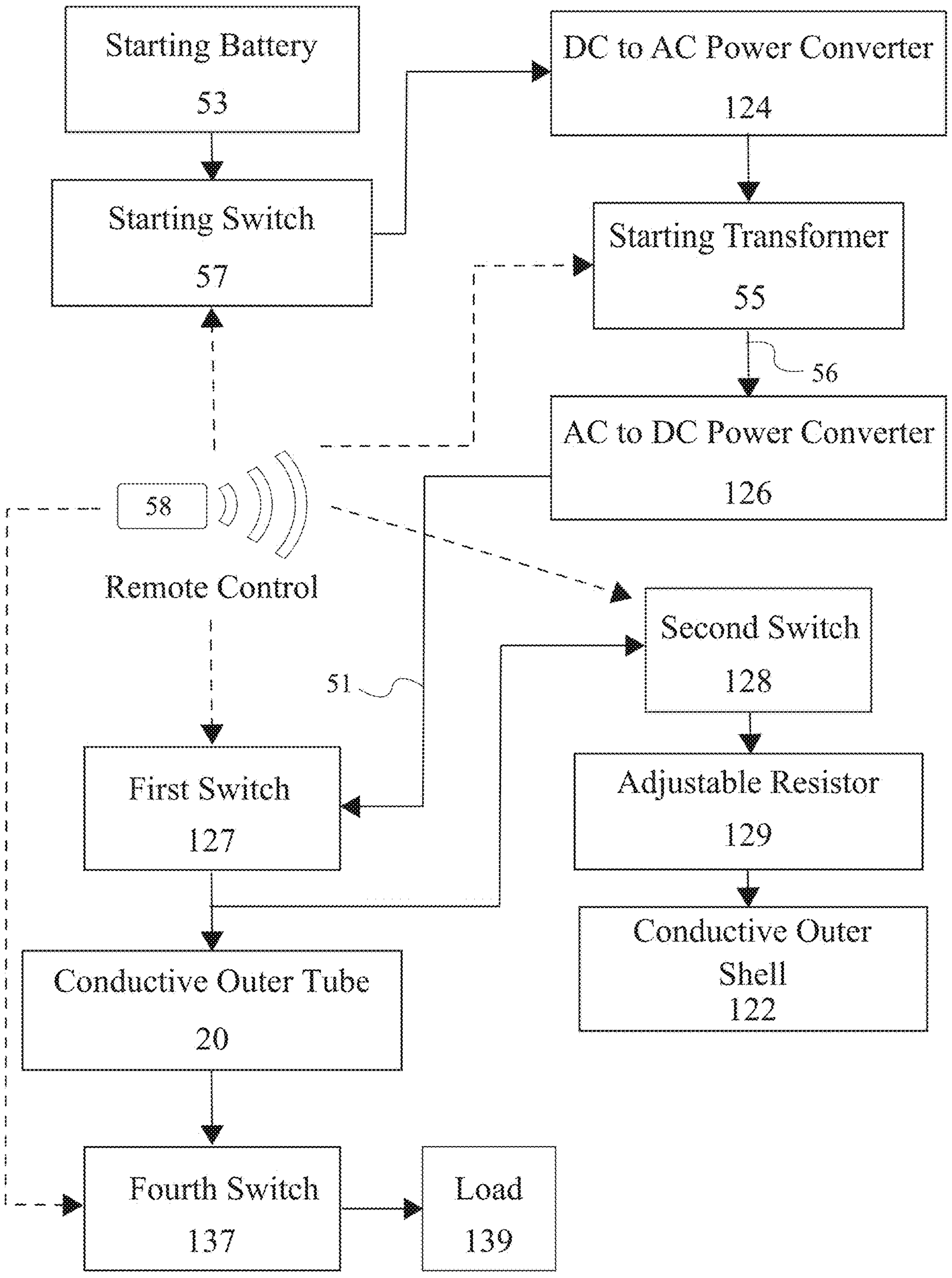
FIG. 6 shows a component diagram for a preferred embodiment of the starting power system of the present invention.

Referring now to FIG. 6, the starting power 51 of the present invention serves the function of providing a starting electrical current 51. The starting electrical current 51 being a high voltage positively charged current supplied to the conductive outer tube 20. The starting power system 51 is further comprised of a starting power source 52, a starting transformer 55, and a starting switch 57.

As seen in FIG. 6, the starting power source 52 of the starting power system serves the function of providing and being the source of the starting electrical current 51. Further, the starting power source 52 is configured to provide the starting electrical current 51. It should be noted that the starting power source 52 may comprise any suitable means of providing a power source including but not limited to batteries, a direct current (DC) power source, or an alternating current (AC) power source. If the starting power source is a direct current power source, the starting power system further comprises a DC-to-AC power converter 124. The DC-to-AC power converter 124 is to convert a DC power source to an AC power source compatible with the starting transformer 55. The DC-to-AC power converter 124 is electrically connected to the starting battery 53 and further electrically connected to the starting transformer 55.

As seen in FIG. 1 and FIG. 6, the starting power source 52 is comprised of at least one direct current power source 54. In accordance to some embodiments, the direct current power source 54 may comprise any number or combination of suitable direct current providers such as batteries, solar cells, fuel cells, or converted from alternating current via a rectifier, wherein the direct current power source 53 is configured to provide a source of direct current power to the starting power system 52.

In a first preferred embodiment of the present invention, the starting power source 52 is comprised of at least one starting battery 53. The starting battery 53 may be comprised of a single battery or a bank of batteries. In other words, the starting battery 53 is configured to provide a source of direct current power to the starting power system 52. To that end, the starting power source 53 is electrically connected to the starting switch 57. Further, the starting transformer 55 is electrically connected to the starting switch 57. It should be noted that electrical connections between components may be made through any suitable means or types of electrical connection such as wires, copper bus bars, or direct connections.

The starting switch 57 of the starting power system 50 serves the function of turning the starting electrical current 51 on or off. In other words, the starting switch 57 is configured to interrupt the starting electrical current 51. The starting switch 57 may be comprised of any suitable means or method for interrupting or turning an electrical current on and off, such as switches or circuitry. Further, the starting switch 57 may be operated by any suitable means or methods such as manually, remotely, or computer controlled.

In the preferred embodiment of the present invention, the starting switch 57 is a remote-controlled electrical switch 58. Remotely controlled, meaning that a user is able to operate the starting switch 57 from a great distance. The starting switch 57 has an on state in which the starting electrical current 51 is allowed to flow freely through the switch. Similarly, the starting switch 57 has an off state in which the starting electrical current 51 is interrupted or stopped from passing through the starting switch 57.

As can be seen in FIG. 1 and FIG. 6, the starting transformer 55 of the starting power system serves the function of adjusting the voltage of the starting electrical current 51. The starting transformer 55 is configured to adjust the voltage of the starting electrical current 51 from the voltage provided by the starting power source 52 to a starting voltage 56. In a preferred embodiment the starting voltage 56 is a high voltage needed to power the conductive outer tube 20. In the preferred embodiment this high voltage would range between 20 to 40 kilovolts (kV). Further embodiments may utilize higher or lower voltages.

Figure 7:
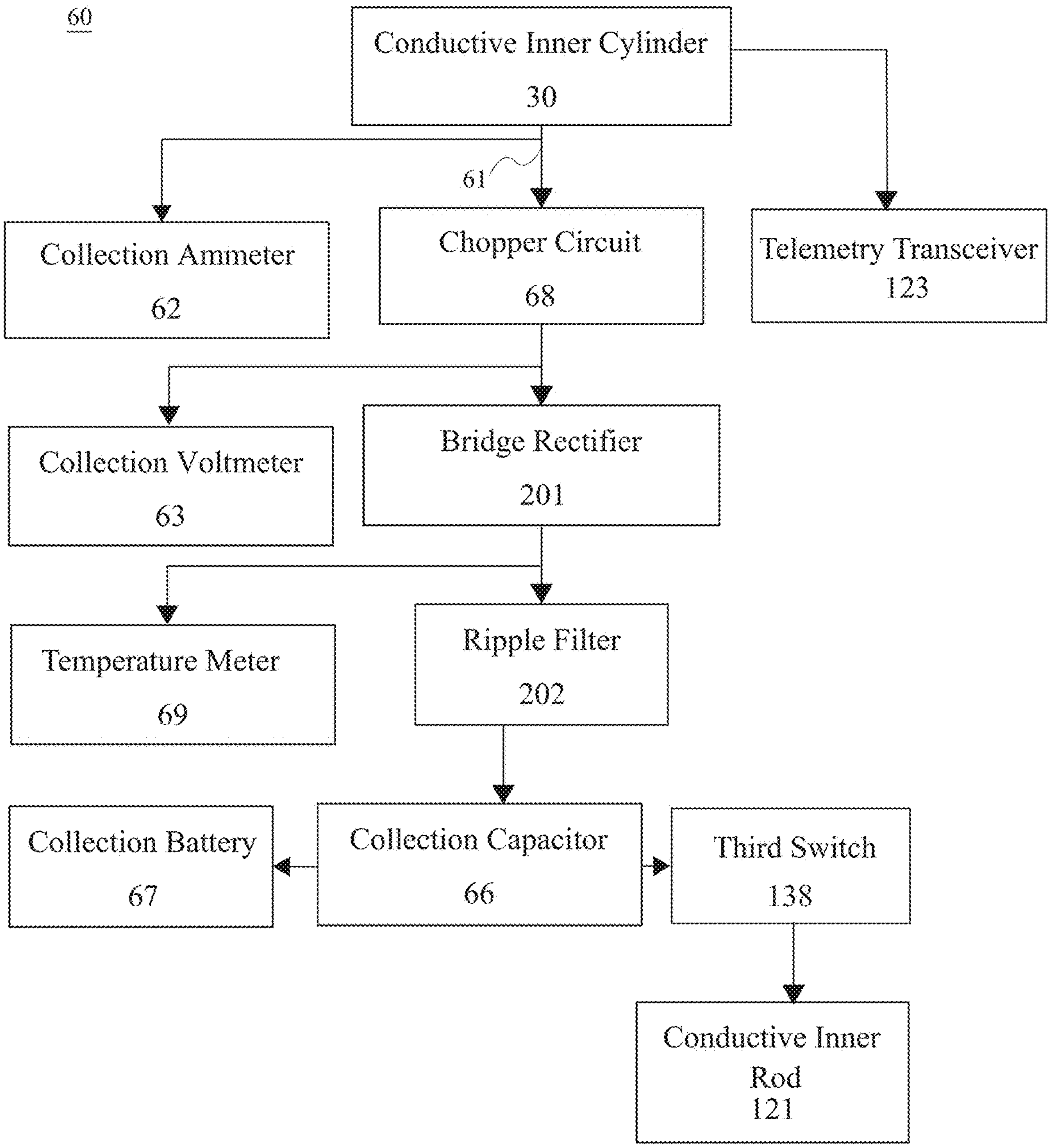
FIG. 7 shows a component diagram for a preferred embodiment of the collection power system of the present invention.

The present invention further comprises an AC to DC power converter 126. The present invention may further comprise a first switch 127, a second switch 128, a third switch 137, a fourth switch 138, and an adjustable resistor 129. The AC to DC power converter 126 is electrically connected to the starting transformer 55. The AC to DC power converter 126 is configured to convert the AC power output from the starting transformer 55. The first switch 127 is electrically connected to the AC to DC power converter 126. The first switch 127, the second switch 128, the third switch 138 and the fourth switch 137 may be comprised of any suitable means or method for interrupting or turning an electrical current on and off, such as switches or circuitry. As can be seen in FIG. 6 and FIG. 7, the first switch 127, the second switch 128, the third switch 138, and the fourth switch 137 may be operated by any suitable means or methods such as manually, remotely, or computer controlled. The conductive outer tube 20 is electrically connected to the first switch 127. The fourth switch 137 is electrically connected to the conductive outer tube 20. A load 139 is electrically connected to the fourth switch 137. The load 139 can be any electrical load that pulls electrical power for the load's function. In the first preferred embodiment, the load 139 is a rocket electrically connected to the fourth switch 137 by a coil of electrical wire. The Rocket is used to carry a positively charged wire 1000 feet in the air to attract negative charges in the clouds and carry the negative charges down to our electron capture device to assist the device to start collecting electrons. The rocket may not be needed to start the electron flow, the positive charged outer tube will attract the electrons in the clouds, so this is a secondary way to start the electron flow if the high voltage does not start it first within a few minutes.

Figure 8:
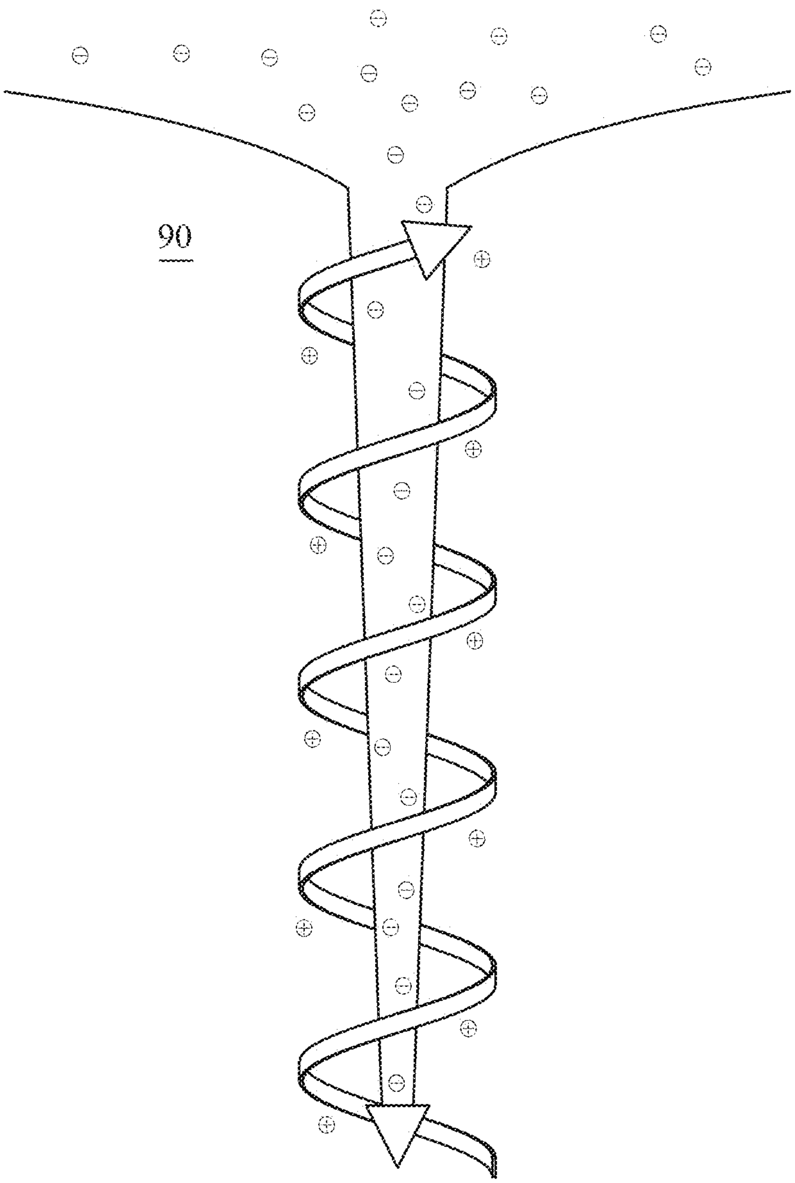
FIG. 8 shows a front elevational view of a cloud tube.

As can be seen in FIG. 6 through FIG. 8, the second switch 128 is also electrically connected to the conductive outer tube 20. The adjustable resistor 129 is electrically connected to the second switch 128. The adjustable resistor 129 serves the function of adjusting the starting voltage 56 of the starting electrical current 51. When the first switch 127 is closed and the second switch 128 and the third switch 137 are opened, the starting current 51 will initiate the charging of the conductive outer tube 20 with a positive charge. The potential difference will attract electrons from the cloud tube 90 and the electrons will migrate. Once the electrons have begun migrating toward collection, the first switch 127 is opened and the second 128 and the third switch 137 are closed allowing the electrons to be collected by the collection power system 60 as described below.

In accordance with some embodiments and as seen in FIG. 1, the present invention further comprises a grounding tube 120. In the first preferred embodiment, the grounding tube 120 comprises a conductive inner rod 121 and a conductive outer shell 122. The conductive outer shell 122 comprises an outer shell diameter and an inner shell diameter. The conductive inner rod 121 comprises an outer rod diameter. The conductive inner rod is disposed within the inner shell diameter and is offset from the outer rod diameter. The conductive outer shell 122 is concentric about the conductive inner rod 121. The conductive shell may have any shape suitable for the grounding tube 120 may be buried in the ground between 20-80 feet depending on the conductivity of the ground in a proximal region of the grounding tube 120. The conductive inner rod 121 can be constructed of any material suitable for holding and transferring a high voltage such as metals, or other conductive materials. The conductive outer shell 122 can be constructed of any material suitable for holding and transferring a high voltage such as metals, or other conductive materials. In accordance to some embodiments, the grounding tube 120 is electrically connected to the starting transformer 55. A tube insulator may be disposed between the outer rod diameter of the conductive inner rod 122 and the inner shell diameter of the conductive outer shell 121. In the first preferred embodiment, the conductive outer shell 122 is electrically connected to the adjustable resistor 129.

This high voltage or potential difference is needed by the present invention in order to attract and start pulling in electrons from a long distance. This positive high voltage is applied to the conductive outer tube 20 which then in turns is able to attract electrons from not only a short range but also a long range such as a cloud or a cloud tube 90.

In further embodiments, the starting transformer 55 may be used to adjust the voltage of the starting electrical current 51 from the starting voltage 56 to a second voltage setting. Said second voltage setting is being used after the starting of the present invention.

The starting system may further comprise at least one ammeter, and at least one voltmeter. At least one amp meter may be electrically connected in series at any location along the starting power system 50 to monitor the starting current 51. At least one voltmeter may be electrically connected to any point along the starting power system 50 and also grounded to monitor the starting voltage 56.

As shown in FIG. 7, the collection power system 60 of the present invention serves the function of transferring and storing the collection electrical current 61. The present invention collects electrons from both close range and long-range sources such as the bottom of clouds and cloud tubes 90. The electrons being collected at the conductive inner cylinder 30 and forming the collection electrical current 61. Thereby, the conductive inner cylinder 30 is configured to receive the collection electrical current 61 from sources such as clouds and cloud tubes 90. The collection electrical current 61 is then transferred from the conductive inner cylinder 30 and stored by the collection power system 60. The collection power system 60 may comprise of any means for transferring and storing a high voltage power current. The preferred embodiment of the collection power system 60 is further comprised of a collection transformer 64, and a collection power bank 65 as seen in FIG. 1.

Figure 4:
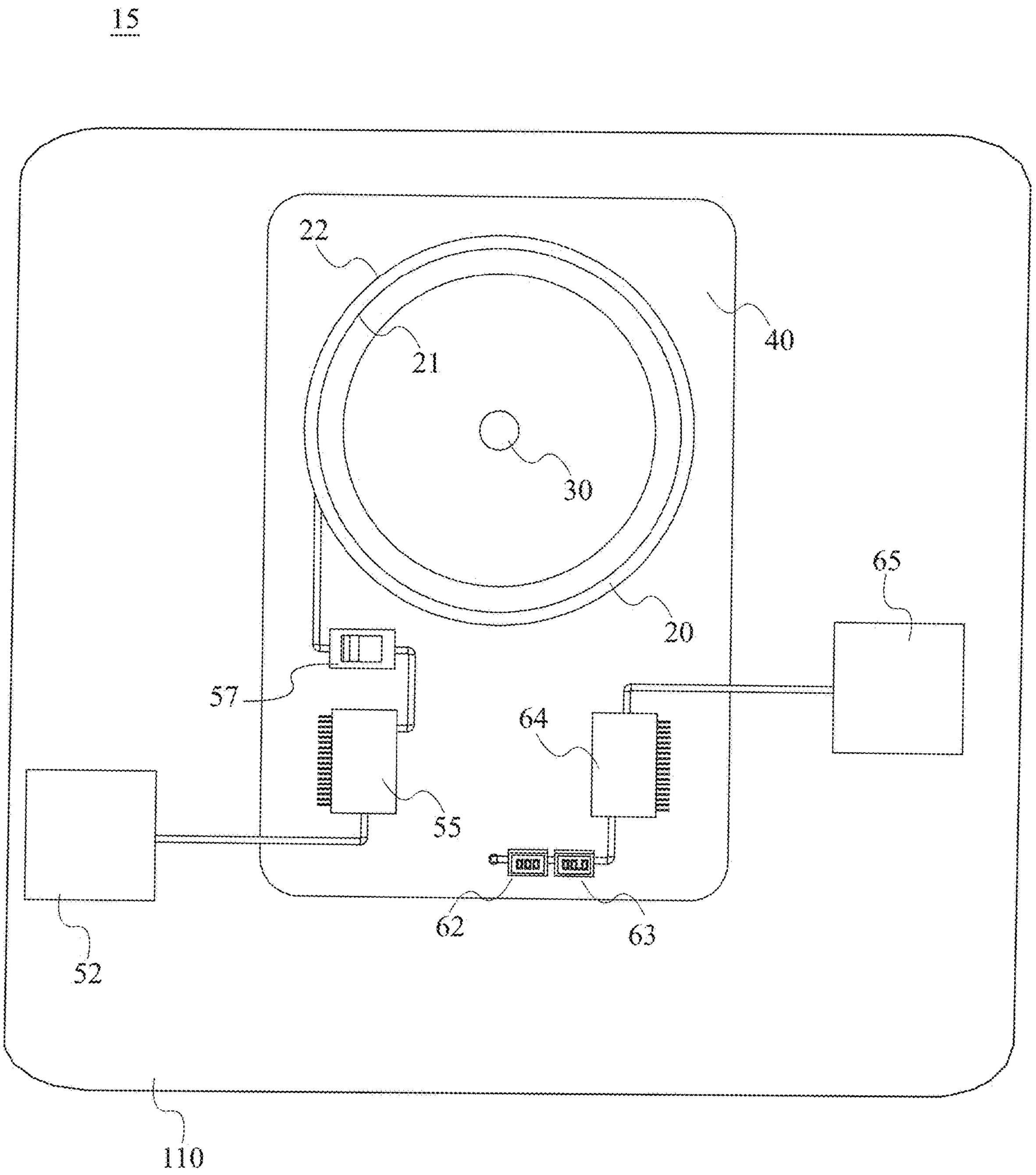
FIG. 4 shows a top plan view of a preferred embodiment of the present invention.
Figure 5:
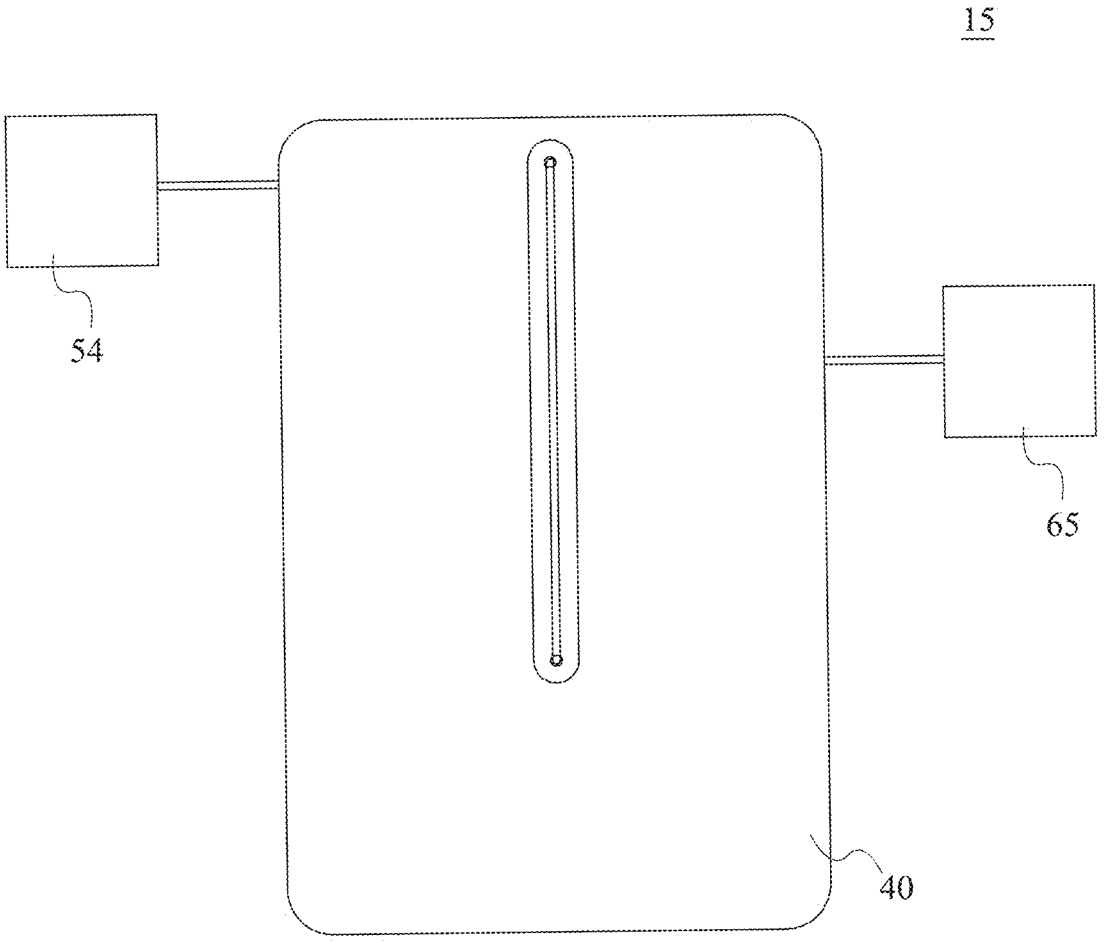
FIG. 5 shows a bottom plan view of a preferred embodiment of the present invention.

As seen in FIG. 4 and FIG. 7, the collection transformer 64 of the collection power system 60 serves the function of adjusting the voltage of the collection electrical current 61. The collection transformer 64 is electrically connected to the conductive inner cylinder 30 which collects the collection electrical current 61. The collection transformer 64 is configured to adjust a collection voltage of the collection electrical current 61 from the collection voltage provided by the conductive inner cylinder 30 to a user preferred voltage.

In a preferred embodiment, the collection electrical current 61 has a high voltage and the collection transformer 64 adjusts the voltage down to the preferred voltage. Further embodiments may utilize higher or lower voltages.

The collection transformer 64 is further electrically connected to the collection power bank 65. Electrical connections between components may be made through any suitable means or types of electrical connection such as wires, copper bus bars, or direct connections.

In further embodiments, the collection power system as seen in FIG. 7 is further comprises a chopper circuit 68. The conductive inner cylinder 30 is electrically connected to the chopper circuit 68. The chopper circuit 68 is further electrically connected to the collection transformer 64. The chopper circuit 68 converts the collection electrical current 61 from a direct current into an alternating current. In yet further embodiments, the chopper circuit 68 creates a square wave with a variable duty cycle.

The collection power bank 65 of the collection power system 60 serves the function of storing the collected power of the collection electrical current 61. The collection power bank 65 is designed and configured to store the electrons of the collection electrical current of 61.

In reference to FIG. 4, the collection power bank 65 is electrically connected to the collection transformer 64, providing the collection electrical current 61 directly from the collection transformer 64. The collection power bank 65 may be comprised of any suitable means or method for storing electrons, power, or energy. As seen in FIG. 7, the third switch 138 is electrically connected between the collection capacitor 66, and the conductive inner rod 121.

In a preferred embodiment, the collection power bank 65 is further comprised of at least one collection capacitor 66 and at least one collection battery 67 as seen in FIG. 7. In the preferred embodiment, at least one collection capacitor 66 is configured to collect and store a large quantity of electrons in a short time period within the collection capacitor 66. The collection capacitor 66 is configured or designed to quickly accept a large number of electrons. The collection battery 67 would then be charged using the charge within the collection capacitor 66. The collection battery 67 is configured and designed for effective long-term storage of electrons, while having a slower charging rate or a slower ability to accept electrons when compared to the collection capacitor 66.

The electrons stored within the collection power bank 65 may then be utilized for any purpose as desired by the user such as powering devices, utilizing the charged batteries or selling power directly to the commercial power grid.

In the preferred embodiment and as seen in FIG. 7, the collection power system 60 further comprises a collection ammeter 62. The collection ammeter 62 is configured to measure the amperage referred to as the collection amperage, of the collection electrical current 61. The collection ammeter 62 is electrically connected to the conductive inner cylinder 30 and further electrically connected to the collection transformer 64. Thereby, the collection ammeter 62 is able to monitor and provide a user with the collection amperage of the collection electrical current 61 as it is being collected from the conductive inner cylinder 30. In other embodiments, and as seen in FIG. 4, the collection ammeter 62 may be electrically connected to the collection transformer 64 and further electrically connected to the collection capacitor 66. In some further embodiments, the collection ammeter 62 may be electrically connected to the collection capacitor 66 and further electrically connected to the connection battery 67.

In the preferred embodiment, the collection power system 60 further comprises a collection voltmeter 63. The collection voltmeter 63 is configured to measure the voltage, referred to as the collection voltage, of the collection electrical current 61. The collection voltmeter 63 is electrically connected to the conductive inner cylinder 30 and further, electrically connected to the collection transformer 64.

Thereby, the collection voltmeter 63 is able to monitor and provide a user with the collection voltage of the collection electrical current 61 as it is being collected from the conductive inner cylinder 30. In other embodiments, the collection voltmeter 63 may be electrically connected to the collection transformer 64 and further electrically connected to the collection capacitor 66. In some further embodiments, the collection voltmeter 63 may be electrically connected to the collection capacitor 66 and further electrically connected to the connection battery 67.

In the preferred embodiment, the collection power system 60 further comprises a temperature meter 69. The temperature meter 69 is configured to measure a collection temperature of the system. The temperature meter 69 is electrically connected to the conductive inner cylinder 30 and further, electrically connected to the collection transformer 64. Thereby, the temperature meter 69 is able to monitor and provide a user with the temperature of heat dissipated by the collection electrical current 61 as it is being collected from the conductive inner cylinder 30. In other embodiments, the temperature meter 69 may be electrically connected to the collection transformer 64 and further electrically connected to the collection capacitor 66. In some further embodiments, the temperature meter 69 may be electrically connected to the collection capacitor 66 and further electrically connected to the connection battery 67.

In accordance with some embodiments, the collection power system 60 further comprises a telemetry transceiver 123. The telemetry transceiver 123 monitors voltage, current, and temperature. The telemetry transceiver 123 can increase or decrease the voltage current in the collection power system 60. The telemetry transceiver is electrically connected to the conductive inner cylinder 30.

In accordance with some embodiments, the collection transformer may be replaced with a bridge rectifier 201 as shown in FIG. 7. The bridge rectifier 201 is configured to convert AC power to a low voltage rectified DC power. A ripple filter 202 may be used to reduce any ripple from the rectified DC power.

The present invention may be utilized by first setting up the apparatus in a location as desired by the user. Desired locations include but are not limited to the perimeters of residential or populated areas mountain ranges, or other high places. The apparatus is started by turning on the starting switch 57 which allows the starting electrical current 51 to flow from the starting power source 52 through the starting transformer 55 to the conductive outer tube 20 thereby, creating a high positive charge voltage on the conductive outer tube 20.

At this point in the operation, the present invention is in a starting state of operation. In the starting state of operation, the starting electrical current 51 is set to a high voltage setting known as the starting voltage 56. As seen in FIG. 8, the starting voltage 56 being a high voltage draws in electrons that are within proximity to the present invention including cloud tubes 90. The electrons are drawn to the conductive inner cylinder 30 where they are collected and stored via the collection power system 60.

Once the present invention has begun pulling in electrons from a cloud tube 90, the starting voltage 56 may be reduced to a lower voltage setting known as the second voltage setting. This is because the cloud tube 90 has already been attracted so the high voltage of the starting voltage 56 is not needed. In further embodiments, the starting electrical current 51 may be completely shut off via the starting switch 57 once the cloud tube 90 is attracted. If needed the starting voltage 56 may be left on as needed, allowing the present invention to attract any electrons or cloud tubes 90 within a proximity to the present invention.

The present invention may be utilized in several different embodiments. In a vehicle embodiment, the apparatus for collecting electrons from cloud tubes 15 is mounted to a vehicle. The type of vehicle including but not limited to aircraft, automobiles, and other mobile vehicles.

Figure 9:
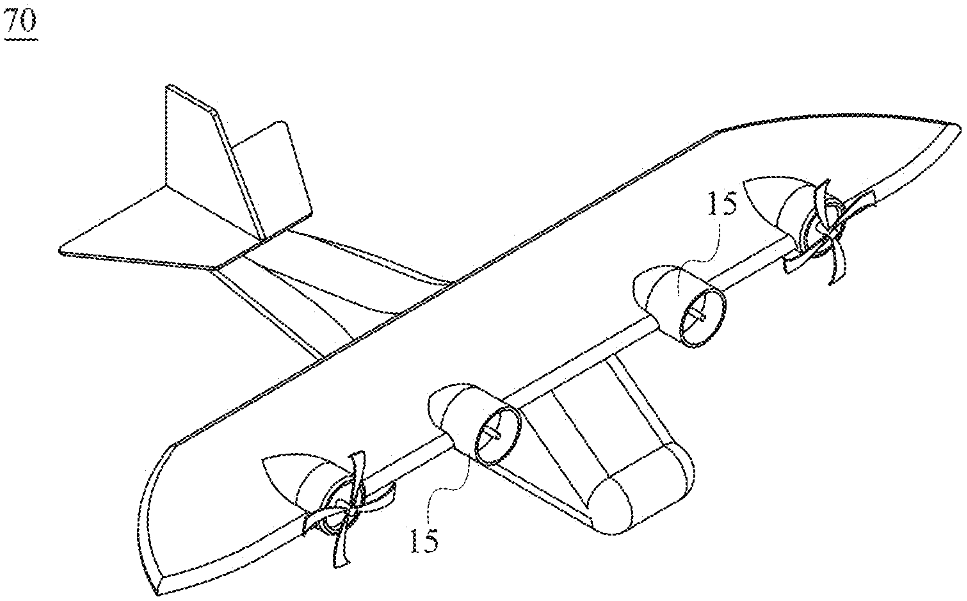
FIG. 9 shows a top-front-left perspective view of a fixed wing aircraft embodiment of the present invention.

In reference to FIG. 9, and in the preferred embodiment of the vehicle embodiment, the present invention is attached or mounted to the wings of a fixed wing aircraft 70. FIG. 9 shows the present invention on the fixed wing aircraft 70. The fixed wing aircraft 70 is electric powered. As the fixed wing aircraft 70 is flown through the air, the present invention is able to attract and collect electrons from the bottom of clouds and cloud tubes 90. In some embodiments, the present invention would be capable of collecting enough electrons to not only power the fixed wing aircraft 70 but to also collect and store electrons within the embodiment's collection power bank 65. Yet further embodiments further comprise a set of electrical or magnetic field sensors. The sensors being used to detect and track cloud tubes 90.

In a further ship embodiment, the apparatus for collecting electrons from cloud tubes 15 is mounted to a water or ocean-going vessel. The type of water or ocean-going vessels including but not limited to ships, barges, or rigs.

Figure 10:
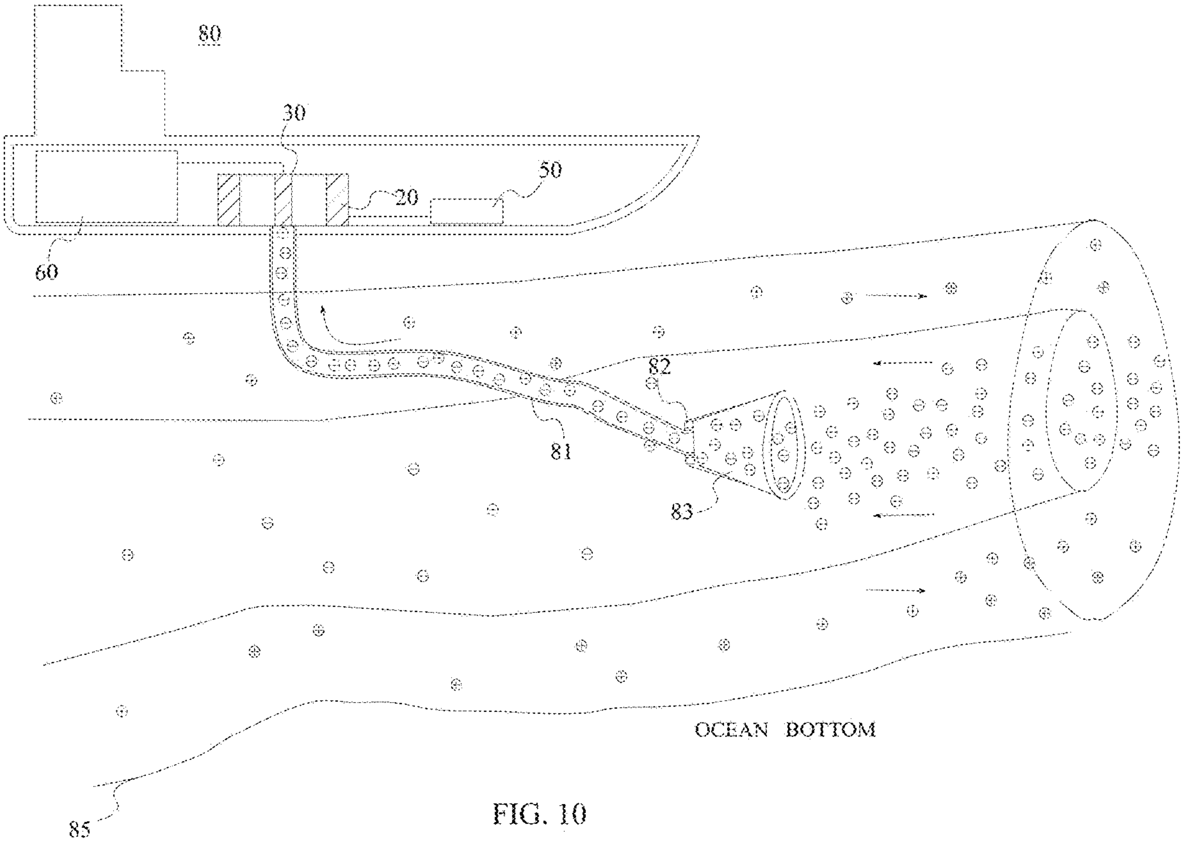
FIG. 10 shows a cross-sectional elevational view of a ship embodiment of the present invention.

In the preferred ship embodiment as shown in FIG. 10, the present invention is integrated into a container ship 80. The present invention further comprises an extended inner tube 81, and a number of positively charged rings 82. The preferred embodiment of the ship can also integrate the funnel 83. The extended inner tube 81 is attached to the conductive inner cylinder 30. The funnel 83 is attached to the extended inner tube 81. The extended inner tube 81 is extended downward from the ship 80 embodiments and positioned to intercept the underwater portion of a cloud tornado tube of the hurricane. In some embodiments, an underwater drone may be used to move and position the extended inner tube 81. The extended inner tube 81 is surrounded by the number of positively charged rings 82. The number of positively charged rings, 82 are being electrically isolated from the extended inner tube 81. The funnel 83 guides the electrons into the extended inner tube 81. In some embodiments, the funnel could be anchored to a region of an ocean floor 85.

In the preferred ship 80 embodiment, the electrons from underwater hurricane cloud tube are attracted by the number of positively charged rings 82 and then guide into and up the extended inner tube 81. The electrons are finally collected by the conductive inner cylinder 30.

Figure 11:
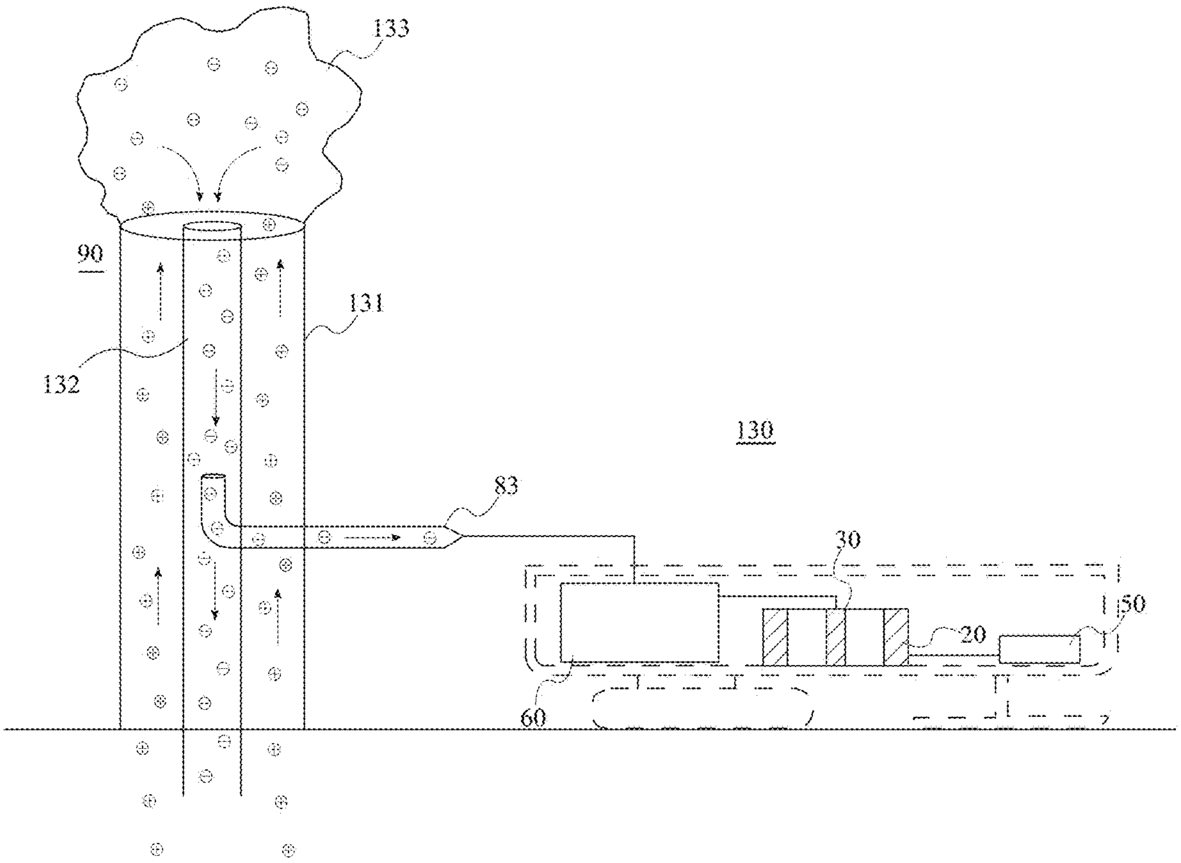
FIG. 11 shows a cross-sectional elevational view of a land vehicle embodiment of the present invention for use in the Artic region.

In a yet further embodiment, and as seen in FIG. 11, the present invention may be utilized in polar location such as the north pole region to collect electrons from northern lights or other electrons high in the atmosphere attracted by the magnetic poles of the earth. FIG. 11 shows a side view for the embodiment of the collection device modified to capture electrons from an electric discharge in process from the ground tubes 90 on the ground rising up 10 to 30 feet high with a sparkling light on top of the tube which indicate there is an electrical discharge in progress. This device has been modified to tap into the ground tube 90 and capture the electrons moving to ground in the center. This device was specifically designed for use in the Northern hemisphere in countries like Alaska, Norway and Sweden. In an alternative embodiment of the vehicle embodiment, the present invention is attached or mounted to a land vehicle such as an automobile. The automobile can be suitable for traveling around the North Pole with either wheels or a track and ski system similar to a snowmobile. At the North Pole, there are physical phenomena of electrical discharge tubes. There is a positive outer layer 131 and a negative inner cylindrical layer 132. The electrical discharge tubes include a discharge end and a ground end. At the discharge end, there is an electrical discharge 133 of excited electrons that emit a white light. The electrons in electrical discharge 133 are funneled down toward the ground end and into the ground. In turn, the positive outer layer 131 funnels positive charges from the ground toward the discharge end. A positively charged funnel 83 can be positioned in the negative inner cylindrical layer 132. The electrons can then be collected through the funnel 83 and into the collection power system 60. The funnel 83 is electrically coupled to the collection power system 60.

Figure 12:
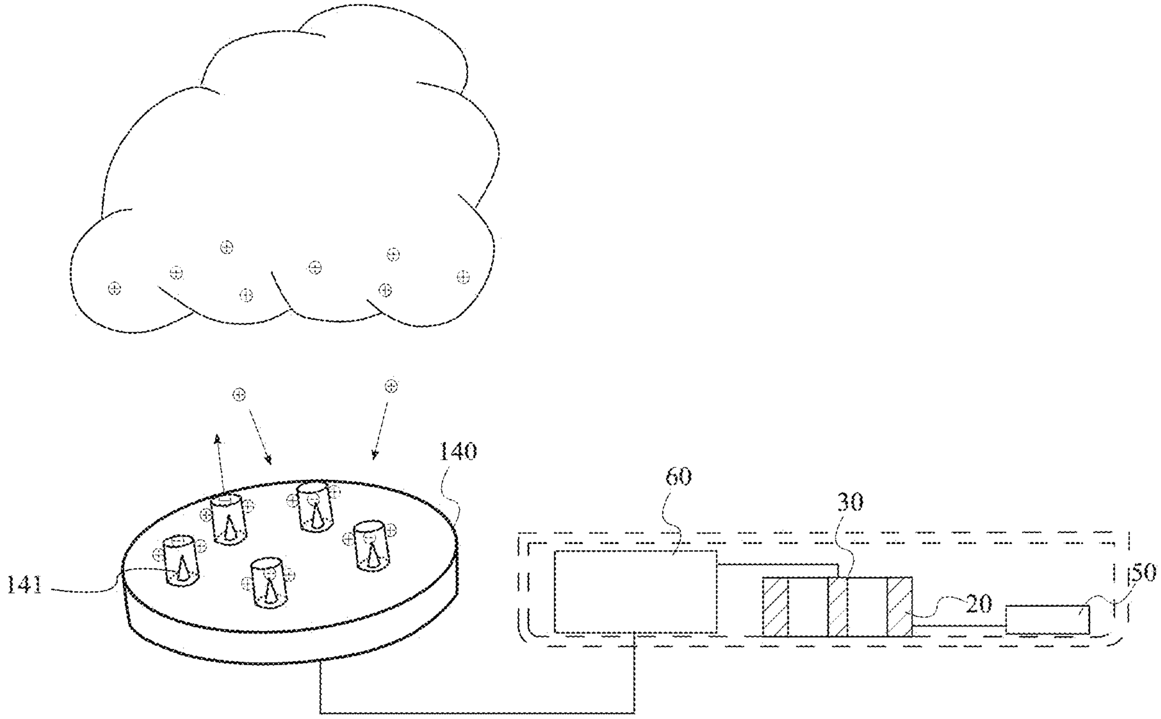
FIG. 12 shows a cross-sectional elevational view of a Southern Hemisphere embodiment of the present invention.

In some other embodiments pertaining to the Southern hemisphere, the polarity of the present invention can also be reversed. In the Southern Hemisphere, the tornado tubes rotate in the opposite direction relative to the tornado tubes in the Northern Hemisphere, so the charged particles are moving in the opposite direction and the polarity of the present invention would be turned upside down for the collection of the electrons. As shown in FIG. 12, the present invention may further comprise a collection plate 140. The collection plate may be constructed of any suitable material or means for holding and transferring a high voltage such as metals, or other conductive materials. The collection plate 140 includes a plurality of conductive spikes 141. One of the pluralities of conductive spikes 141 can be constructed of any suitable material or means for holding and transferring a high voltage such as metals, or other conductive materials. The collection plate 140 is electrically connected to the collection power system 60. The plurality of conductive spikes 141 are negatively charged by either the surroundings or the starting power system 50. Once the plurality of conductive spikes 141 are charged a positive outer layer forms around the plurality of conductive spikes 141. The starting power system may be switched off.

The grounding tube 120 is buried between 20-80 feet, depending on the conductivity of the ground. The grounding tube 120 may have multiple grounding tubes. One of the pluralities of tubules 125 comprises a tubule core and a tubule outer cylinder. The present invention may also be used in conjunction with a solar farm. The solar farm comprises at least one solar panel, and a storage system. The present invention may enhance the solar farms' efficiency. The solar farm may not generate solar energy during the night or a cloudy and/or rainy day. Also, the solar farm only works about 6-8 hrs/day while the electron from clouds will work 24 hrs/day. Many of the mid-western states have 50 days of rain a year so their solar system in these states will not produce electric power 50 days/year. This system will fill the gap for those 50 days and will produce electricity 24 hours per day and produce which would be equivalent to 150 days of sunshine if we had an equal number of electrons from the clouds devices and solar cells. The present invention can generate energy during the night and also during cloudy and/or rainy days. The present invention may be positioned around the periphery of the solar farm. In some embodiments, the present invention may include many collection power systems that are positioned around the solar farm. The present invention may also be positioned between a city and tornadoes, storms, or the like to collect electrons. The plurality of collection power systems may be positioned in rows between the storms and the city.

Although the invention has been explained in relation to its preferred embodiment, it is to be understood that many other possible modifications and variations can be made without departing from the spirit and scope of the invention.

What is claimed is:

1. An apparatus for collecting electrons from cloud bottoms and cloud tubes comprises:
a conductive outer tube;
a conductive inner cylinder;
a first insulating base;
a starting power system;
a collection power system;
a grounding tube;
the conductive outer tube having an exterior diameter and an interior diameter;
the conductive inner cylinder being within the interior diameter of the conductive outer tube;
the conductive outer tube and the conductive inner cylinder being attached to the first insulating base;
the conductive outer tube being electrically isolated from the conductive inner cylinder;
the starting power system comprised of:
a starting switch;
a starting power source,
a starting transformer,
the starting power source being configured to provide a starting electrical current;
the starting switch being electrically connected to the starting power source;
the starting switch being configured to interrupt the starting electrical current;
the starting transformer being electrically connected to the starting switch;
the starting transformer being configured to adjust a starting voltage of the starting electrical current provided by the starting power source;
the conductive outer tube being electrically connected to the starting transformer;
the collection power system is further comprised of:
a collection transformer,
a collection power bank;
the conductive inner cylinder being configured to receive a collection electrical current from bottom of the clouds and cloud tubes;
the conductive inner cylinder being electrically connected to the collection transformer;
the collection transformer being configured to adjust a collection voltage of the collection electrical current;
the collection power bank being electrically connected to the collection transformer;
the collection power bank being configured to store the collection electrical current;
the grounding tube comprises:
a conductive inner rod,
a conductive outer shell the conductive outer shell further comprises:
an outer shell diameter,
an inner shell diameter;
the conductive inner rod comprises:
an outer rod diameter;
the conductive inner rod is disposed within the inner shell diameter;
the conductive inner rod is electrically connected to the collection power bank;
the conductive outer shell is electrically connected to the conductive outer tube;
the apparatus for collecting electrons from cloud tubes is mounted to a ship;

the conductive inner cylinder is further comprised of an extended inner tube;

the extended inner tube further comprised a number of positively charged rings;

the extended inner tube being attached to conductive inner cylinder; and the number of positively charged rings surrounding the extended inner tube.

2. The apparatus for collecting electrons from cloud bottoms and cloud tubes as claimed in claim 1 comprises:

the conductive inner cylinder being concentric with the interior diameter of the conductive outer tube.

3. The apparatus for collecting electrons from cloud bottoms and cloud tubes as claimed in claim 1 comprises:

a direct current (DC) to alternating current (AC) converter;

the starting power source comprises at least one starting battery;

the DC-to-AC power converter is electrically connected to one of the at least one starting battery; and the starting transformer is electrically connected to the direct current (DC) to alternating current (AC) converter.

4. The apparatus for collecting electrons from cloud bottoms and cloud tubes as claimed in claim 1 comprises:

the starting power source comprises at least one direct current power source.

5. The apparatus for collecting electrons from cloud bottoms and cloud tubes as claimed in claim 1 comprises:

the starting switch being remote controlled.

6. The apparatus for collecting electrons from cloud bottoms and cloud tubes as claimed in claim 1 comprises:

the collection power bank being further comprised of at least one collection battery.

7. The apparatus for collecting electrons from cloud bottoms and cloud tubes as claimed in claim 6 comprises:

the collection power bank being further comprised of at least one collection capacitor.

8. The apparatus for collecting electrons from cloud bottoms and cloud tubes as claimed in claim 1 comprises:

the collection power system being further comprised of a chopper circuit; and the chopper circuit being configured to convert the collection electrical current from a direct current into an alternating current.

9. The apparatus for collecting electrons from cloud bottoms and cloud tubes as claimed in claim 1 comprises:

the collection power system is further comprised of:

a collection ammeter;

a temperature meter;

a collection voltmeter;

the collection ammeter being configured to measure a collection amperage of the collection electrical current;

the collection ammeter being electrically connected to the conductive inner cylinder and further being electrically connected to the collection transformer;

the collection voltmeter being configured to measure a collection voltage of the collection electrical current;

the collection voltmeter being electrically connected to the conductive inner cylinder and further being electrically connected to the collection transformer;

the temperature meter being configured to measure a collection temperature of heat dissipated by the collection electrical current; and the temperature meter being electrically connected to the conductive inner cylinder and further being electrically connected to the collection transformer.

* * * * *